United States Patent
Merry et al.

(10) Patent No.: US 11,401,831 B2
(45) Date of Patent: *Aug. 2, 2022

(54) GAS TURBINE ENGINE SHAFT BEARING CONFIGURATION

(71) Applicant: RAYTHEON TECHNOLOGIES CORPORATION, Hartford, CT (US)

(72) Inventors: Brian D. Merry, Andover, CT (US); Gabriel L Suciu, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1444 days.

This patent is subject to a terminal disclaimer.

(21) Appl. No.: 13/904,416

(22) Filed: May 29, 2013

(65) Prior Publication Data

US 2013/0312419 A1 Nov. 28, 2013

Related U.S. Application Data

(63) Continuation of application No. 13/762,970, filed on Feb. 8, 2013, now Pat. No. 8,511,061, which is a
(Continued)

(51) Int. Cl.
*F01D 25/16* (2006.01)
*F02C 7/36* (2006.01)
(Continued)

(52) U.S. Cl.
CPC .......... *F01D 25/16* (2013.01); *F01D 25/162* (2013.01); *F02C 7/06* (2013.01); *F02C 7/36* (2013.01);
(Continued)

(58) Field of Classification Search
CPC .......... F01D 25/16; F01D 25/162; F02C 7/06; F02C 7/36; F02K 3/04; F05D 2250/19; F05D 2260/40311
See application file for complete search history.

(56) References Cited

U.S. PATENT DOCUMENTS 3,287,906 A 11/1966 McCormick
3,549,272 A 12/1970 Bouiller et al.
(Continued)

FOREIGN PATENT DOCUMENTS

EP 0203881 12/1986
EP 2584153 4/2013
(Continued)

OTHER PUBLICATIONS

International Preliminary Report on Patentability for PCT Application No. PCT/US2013/020462 dated Aug. 5, 2014.
(Continued)

*Primary Examiner* — Ted Kim
(74) *Attorney, Agent, or Firm* — Carlson, Gaskey & Olds, P.C.

(57) ABSTRACT

A gas turbine engine includes a core housing that has an inlet case and an intermediate case that respectively provide an inlet case flow path and an intermediate case flow path. The shaft supports a compressor section that is arranged axially between the inlet case flow path and the intermediate case flow path. A geared architecture is coupled to the shaft, and a fan coupled to and rotationally driven by the geared architecture. The geared architecture includes a sun gear supported on the second end. A first bearing supports the shaft relative to the intermediate case and a second bearing supporting the shaft relative to the inlet case. The second bearing is arranged radially outward from the shaft.

18 Claims, 2 Drawing Sheets

Related U.S. Application Data continuation of application No. 13/362,170, filed on Jan. 31, 2012, now Pat. No. 8,402,741.

(51) Int. Cl.
    *F02K 3/04*           (2006.01)
    *F02C 7/06*           (2006.01)

(52) U.S. Cl.
    CPC ............ *F02K 3/04* (2013.01); *F05D 2250/19* (2013.01); *F05D 2260/40311* (2013.01)

(56) References Cited

U.S. PATENT DOCUMENTS

| | | | |
|---|---|---|---|
| 3,638,428 | A | 2/1972 | Shipley et al. |
| 3,727,998 | A | 4/1973 | Haworth et al. |
| 3,747,343 | A | 7/1973 | Rosen |
| 3,754,484 | A | 8/1973 | Roberts |
| 3,792,586 | A | 2/1974 | Kasmarik et al. |
| 3,892,358 | A | 7/1975 | Gisslen |
| 3,896,615 | A | 7/1975 | Slatkin et al. |
| 4,003,199 | A | 1/1977 | Bell et al. |
| 4,050,527 | A * | 9/1977 | Lebelle ............... E02D 7/18 74/61 |
| 4,055,946 | A | 11/1977 | Sens |
| 4,130,872 | A | 12/1978 | Harloff |
| 4,452,037 | A | 6/1984 | Waddington et al. |
| 4,500,143 | A | 2/1985 | Kervistin et al. |
| 4,704,862 | A | 11/1987 | Dennison et al. |
| 4,827,712 | A | 9/1989 | Coplin |
| 4,916,894 | A | 4/1990 | Adamson et al. |
| 5,155,993 | A | 10/1992 | Baughman et al. |
| 5,343,696 | A | 9/1994 | Rohra et al. |
| 5,433,674 | A * | 7/1995 | Sheridan ............... F16H 1/2809 475/346 |
| 5,447,411 | A | 9/1995 | Curley et al. |
| 5,524,847 | A | 6/1996 | Brodell et al. |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 6,158,210 | A | 12/2000 | Orlando |
| 6,223,616 | B1 | 5/2001 | Sheridan |
| 6,318,070 | B1 | 11/2001 | Rey et al. |
| 6,464,401 | B1 | 10/2002 | Allard |
| 6,619,030 | B1 | 9/2003 | Seda et al. |
| 6,732,502 | B2 | 5/2004 | Seda et al. |
| 6,814,541 | B2 | 11/2004 | Evans et al. |
| 7,021,042 | B2 | 4/2006 | Law |
| 7,490,460 | B2 | 2/2009 | Moniz et al. |
| 7,493,753 | B2 | 2/2009 | Moniz et al. |
| 7,591,594 | B2 | 9/2009 | Charier et al. |
| 7,591,754 | B2 | 9/2009 | Duong et al. |
| 7,694,505 | B2 | 4/2010 | Schilling |
| 7,704,178 | B2 | 4/2010 | Sheridan et al. |
| 7,730,715 | B2 | 6/2010 | Grudnoski et al. |
| 7,824,305 | B2 | 11/2010 | Duong et al. |
| 7,832,193 | B2 | 11/2010 | Orlando et al. |
| 7,882,693 | B2 | 2/2011 | Schilling |
| 7,926,260 | B2 | 4/2011 | Sheridan et al. |
| 8,104,262 | B2 | 1/2012 | Marshall |
| 8,205,432 | B2 | 6/2012 | Sheridan |
| 8,225,593 | B2 | 7/2012 | Le Hong et al. |
| 8,402,741 | B1 | 3/2013 | Merry et al. |
| 8,511,061 | B1 * | 8/2013 | Merry ............... F01D 25/16 60/226.1 |
| 2001/0047651 | A1 | 12/2001 | Fakutani |
| 2005/0026745 | A1 | 2/2005 | Mitrovic |
| 2005/0265825 | A1 | 12/2005 | Lewis |
| 2006/0130456 | A1 | 6/2006 | Suciu et al. |
| 2007/0084183 | A1 | 4/2007 | Moniz et al. |
| 2007/0087892 | A1 | 4/2007 | Orlando et al. |
| 2008/0098715 | A1 * | 5/2008 | Orlando ............... F02K 3/072 60/226.1 |
| 2008/0148707 | A1 | 6/2008 | Schilling |
| 2008/0152477 | A1 | 6/2008 | Moniz et al. |
| 2009/0056306 | A1 | 3/2009 | Suciu et al. |
| 2009/0074565 | A1 | 3/2009 | Suciu et al. |
| 2009/0081035 | A1 | 3/2009 | Merry et al. |
| 2009/0090096 | A1 * | 4/2009 | Sheridan ............... F02C 7/36 60/226.3 |
| 2009/0092487 | A1 | 4/2009 | McCune et al. |
| 2010/0058735 | A1 | 3/2010 | Hurwitz et al. |
| 2010/0105516 | A1 | 4/2010 | Sheridan et al. |
| 2010/0148396 | A1 | 6/2010 | Xie et al. |
| 2010/0150702 | A1 * | 6/2010 | Sheridan ............... F01D 5/06 415/170.1 |
| 2010/0218478 | A1 | 9/2010 | Merry et al. |
| 2010/0294371 | A1 | 11/2010 | Parnin et al. |
| 2010/0296947 | A1 | 11/2010 | DiBenedetto et al. |
| 2010/0331139 | A1 | 12/2010 | McCune |
| 2011/0130246 | A1 | 6/2011 | McCune et al. |
| 2011/0289900 | A1 | 12/2011 | Stern |
| 2012/0195753 | A1 | 8/2012 | Davis et al. |
| 2012/0243971 | A1 | 9/2012 | McCune et al. |
| 2012/0257960 | A1 | 10/2012 | Reinhardt et al. |
| 2013/0192198 | A1 | 8/2013 | Brilliant et al. |
| 2013/0319006 | A1 | 12/2013 | Parnin et al. |

FOREIGN PATENT DOCUMENTS

| | | |
|---|---|---|
| EP | 2597292 | 5/2013 |
| GB | 1516041 | 6/1978 |
| GB | 2041090 | 9/1980 |
| WO | 2007038674 | 4/2007 |
| WO | 2015047489 A1 | 4/2015 |

OTHER PUBLICATIONS

Walsh et al., "Gas Turbine Performance," 1998, 2004, Blackwell Science Ltd., Chapter 5, pp. 159-177.

International Search Report and Written Opinion for International Application No. PCT/US2014/043184 dated Dec. 4, 2014.

International Search Report and Written Opinion for PCT/US14/43175 completed on Dec. 17, 2014.

International Search Report and Written Opinion for PCT Application No. PCT/US2014/043195, dated Feb. 18, 2015.

Amato et al., "Planetary Gears" poster, http://www.roymech.co.uk/Useful_Tables/drive/Epi_cyclic-gears.html, downloaded Aug. 6, 2015 1 page.

"Epicylic Gears", http://www.webpages.uidaho.edu/mindworks/Machine_Design/Posters/PDF/Planetary%20Gears%20Poster.pdf, downloaded Aug. 6, 2015, pp. 1-12.

Supplementary European Search Report for PCT Application PCT/US2013/020462, dated Aug. 6, 2015.

Supplementary European Search Report for European Patent Application No. 13770230.4, dated Aug. 6, 2015.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

(56) References Cited

OTHER PUBLICATIONS

Griffiths, B. (2005). Composite fan blade containment case. Modem Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical reviewon nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolutionof a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

International Preliminary Report on Patentability for PCT Application No. PCT/US2014/043195, dated Feb. 11, 2016.

International Preliminary Report on Patentability for PCT Application No. PCT/US2014/043184, dated Feb. 11, 2016.

International Preliminary Report on Patentability for PCT Application No. PCT/US2014/043175, dated Feb. 11, 2016.

Extended European Search Report for European Application No. 15199861.4 dated Sep. 16, 2016.

Extended European Search Report for European Application No. 14831206.9 dated Mar. 2, 2017.

Extended European Search Report for European Application No. 14849357.0 dated Mar. 22, 2017.

Gunston, Bill, "Jane's Aero-Engines," Issue Seven, 2000, pp. 510-512.

International Search Report for PCT Application No. PCT/US2013/020462, dated Jul. 30, 2013.

European Search Report for European Patent Application No. 14849357.0 dated Feb. 22, 2017.

European Search Report for European Patent Application No. 14831790.2 dated Mar. 29, 2017.

"Fan engineering, Information and recommendations for the engineer," Twin City Fan Companies, LTD, 2000.

European Search Report for European Application No. 18208937.5 dated Mar. 8, 2019.

(56) References Cited

OTHER PUBLICATIONS

Johnston, R.P., Hirschkron, R., Koch, C.C., Neitzel, R.E., and Vinson, P.W. (1978). Energy efficient engine: Preliminary design and integration study-final report. NASA CR-135444. Sep. 1978. pp. 1-401.

Johnston, R.P. and Hemsworth, M.C. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp 1-187.

Anderson, R.D. (1985). Advanced Propfan Engine Technology (APET) definition study, single and counter-rotation gearbox/pitch change mechanism design. NASA CR-168115. Jul. 1, 1985. pp 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. March 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975 pp. 1-9.

NASA Conference Publication. (1978). CTOL transport technology. NASA-CP-2036-PT-1. Jun. 1, 1978. pp. 1-531.

\* cited by examiner

GAS TURBINE ENGINE SHAFT BEARING CONFIGURATION

This application is a continuation of U.S. application Ser. No. 13/762,970, filed on Feb. 8, 2013, now U.S. Pat. No. 8,511,061, which is a continuation of U.S. application Ser. No. 13/362,170, filed on Jan. 31, 2012, now U.S. Pat. No. 8,402,741 issued Mar. 26, 2013.

BACKGROUND

This disclosure relates to a gas turbine engine bearing configuration for a shaft. In one example, the bearing arrangement relates to a low shaft.

A typical jet engine has two or three spools, or shafts, that transmit torque between the turbine and compressor sections of the engine. Each of these spools is typically supported by two bearings. One bearing, for example, a ball bearing, is arranged at a forward end of the spool and is configured to react to both axial and radial loads. Another bearing, for example, a roller bearing is arranged at the aft end of the spool and is configured to react only to radial loads. This bearing arrangement fully constrains the shaft except for rotation, and axial movement of one free end is permitted to accommodate engine axial growth.

SUMMARY

In one exemplary embodiment, a gas turbine engine includes a core housing that has an inlet case and an intermediate case that respectively provide an inlet case flow path and an intermediate case flow path. The shaft supports a compressor section that is arranged axially between the inlet case flow path and the intermediate case flow path. A geared architecture is coupled to the shaft, and a fan coupled to and rotationally driven by the geared architecture. The geared architecture includes a sun gear supported on the shaft. A first bearing supports the shaft relative to the intermediate case and a second bearing supporting the shaft relative to the inlet case. The second bearing is arranged radially outward from the shaft.

In a further embodiment of any of the above, the shaft includes a hub secured to the main shaft. The compressor section includes a rotor mounted to the hub. The hub supports the second bearing.

In a further embodiment of any of the above, the inlet case includes an inlet case portion defining the inlet case flow path. A bearing support portion is removably secured to the inlet case portion. The second bearing is mounted to the bearing support portion.

In a further embodiment of any of the above, the inlet case includes a first inlet case portion defining the inlet case flow path. A bearing support portion is removably secured to the inlet case portion. The second bearing is mounted to the bearing support portion.

In a further embodiment of any of the above, the intermediate case includes an intermediate case portion defining the intermediate case flow path. A bearing support portion is removably secured to the intermediate case portion. The first bearing is mounted to the bearing support portion.

In a further embodiment of any of the above, the first bearing is a ball bearing and the second bearing is a roller bearing.

In a further embodiment of any of the above, the first and second bearings are arranged in separate sealed lubrication compartments.

In a further embodiment of any of the above, the second bearing and the geared architecture are arranged in a lubrication compartment.

In one exemplary embodiment, a gas turbine engine includes a core housing that provides a core flow path. The gas turbine engine includes a fan and a shaft that supports a compressor section arranged within the core flow path. The compressor section is fluidly connected to the fan. The compressor section includes a first pressure compressor and a second pressure compressor upstream from the first pressure compressor. The second pressure compressor includes multiple compressor stages. First and second bearings support the shaft relative to the core housing and are arranged radially inward of and axially overlapping with at least some of the multiple compressor stages. The gas turbine engine is a high bypass geared aircraft engine having a bypass ratio of greater than about six (6).

In a further embodiment of any of the above, combustor is fluidly connected to the compressor section. A turbine section is fluidly connected to the combustor. The turbine section includes a high pressure turbine and a low pressure turbine.

In a further embodiment of any of the above, the core housing includes a first inlet case portion defining an inlet case flow path, and a bearing support portion removably secured to the inlet case portion. A second bearing mounts to the bearing support portion.

In a further embodiment of any of the above, the core housing includes an intermediate case portion defining an intermediate case flow path, and a bearing support portion removably secured to the intermediate case portion. The first bearing is mounted to the bearing support portion.

In a further embodiment of any of the above, the multiple compressor stages include a variable stator vane array, rotatable compressor blades, and a fixed stator vane array.

In one exemplary embodiment, a gas turbine engine includes a core housing that provides a core flow path. The gas turbine engine also includes a fan and a shaft that supports a compressor section arranged within the core flow path. The compressor section is fluidly connected to the fan. The compressor section includes a first pressure compressor and a second pressure compressor upstream from the first pressure compressor. The second pressure compressor includes multiple compressor stages. The first and second bearings support the shaft and are relative to the core housing and are arranged radially inward of and axially overlapping with at least some of the multiple compressor stages. A combustor is fluidly connected to the compressor section. A turbine section is fluidly connected to the combustor. The turbine section includes a high pressure turbine and a low pressure turbine. The gas turbine engine includes at least one of a low Fan Pressure Ratio of less than about 1.45 and a low pressure turbine pressure ratio that is greater than about 5.

BRIEF DESCRIPTION OF THE DRAWINGS

The disclosure can be further understood by reference to the following detailed description when considered in connection with the accompanying drawings wherein.

DETAILED DESCRIPTION

Figure 1:
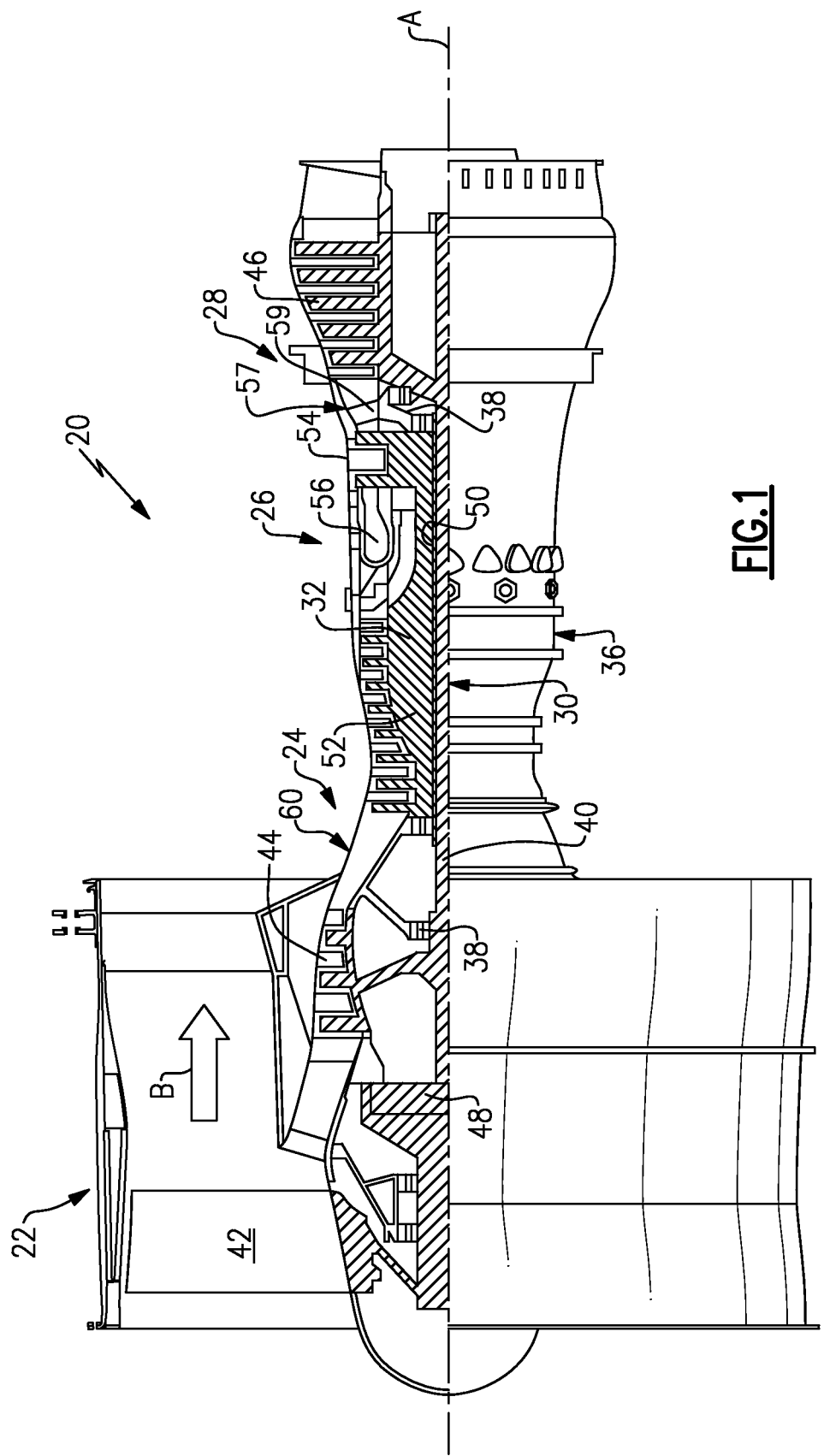
FIG. 1 schematically illustrates a gas turbine engine.
Figure 2:
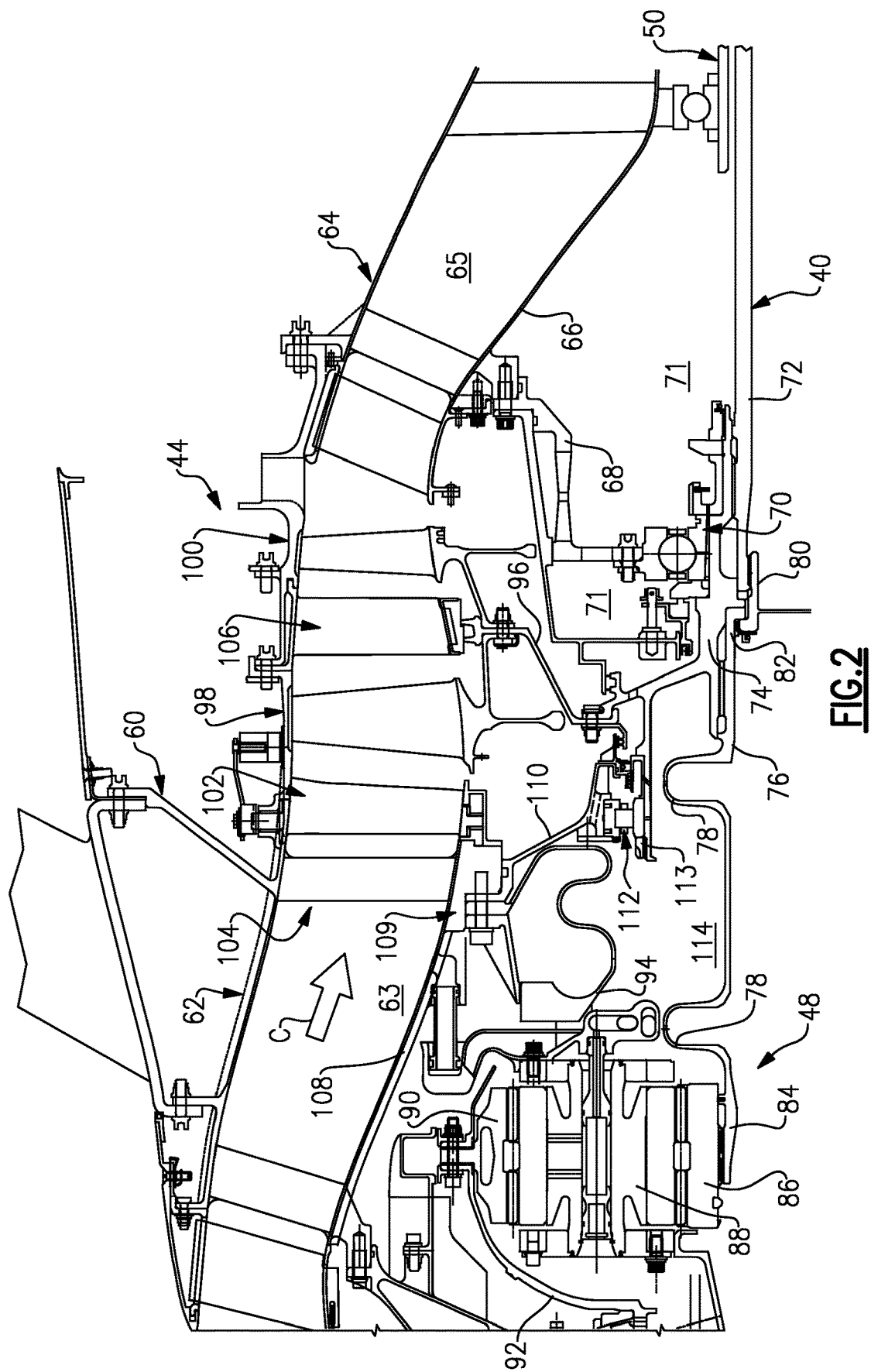
FIG. 2 is a cross-sectional view of a front architecture of the gas turbine engine shown in FIG. 1.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C (as shown in FIG. 2) for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a star gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Referring to FIG. 2, a core housing 60 includes an inlet case 62 and an intermediate case 64 that respectively provide an inlet case flowpath 63 and a compressor case flowpath 65. Together, the inlet and compressor case flowpaths 63, 65, in part, define a core flowpath through the engine 20, which directs a core flow C.

The intermediate case 64 includes multiple components, which includes the intermediate case portions 66, and the bearing support 68 in the example, which are removably secured to one another. The bearing support portion 68 has a first bearing 70 mounted thereto, which supports the inner shaft 40 for rotation relative to the intermediate case 64. In one example, the first bearing 70 is a ball bearing that constrains the inner shaft 40 against axial and radial movement at a forward portion of the inner shaft 40. The first bearing 70 is arranged within a bearing compartment 71.

In the example, the inner shaft 40 is constructed of multiple components that include, for example, a main shaft 72, a hub 74 and a flex shaft 76, which are clamped together by a nut 80 in the example. The first bearing 70 is mounted on the hub 74. The flex shaft 76 includes first and second opposing ends 82, 84. The first end 82 is splined to the hub 74, and the second end 84 is splined to and supports a sun gear 86 of the geared architecture 48. Bellows 78 in the flex shaft 76 accommodate vibration in the geared architecture 48.

The geared architecture includes star gears 88 arranged circumferentially about and intermeshing with the sun gear 86. A ring gear 90 is arranged circumferentially about and intermeshes with the star gears 88. A fan shaft 92 is connected to the ring gear 90 and the fan 42 (FIG. 1). A torque frame 94 supports the star gears 88 and grounds the star gears 88 to the housing 60. In operation, the inner shaft 40 rotationally drives the fan shaft 92 with the rotating ring gear 90 through the grounded star gears 88.

The low pressure compressor 44 includes multiple compressor stages arranged between the inlet and intermediate case flowpaths 63, 65, for example, first and second compressor stages 98, 100, that are secured to the hub 74 by a rotor 96. The first bearing 70 is axially aligned with one of the first and second compressor stages 98, 100. In one example, a variable stator vane array 102 is arranged upstream from the first and second compressor stages 98, 100. Struts 104 are arranged upstream from the variable stator vane array 102. An array of fixed stator vanes 106 may be provided axially between the first and second compressor stages 98, 100. Although a particular configuration of low pressure compressor 44 is illustrated, it should be understood that other configurations may be used and still fall within the scope of this disclosure.

The inlet case 62 includes inlet case portions 108, and bearing support 110, which are removably secured to one another. The bearing support portion 110 and torque frame 94 are secured to the inlet case portion 108 at a joint 109. The bearing support portion 110 supports a second bearing 112, which is a rolling bearing in one example. The second bearing 112 is retained on the hub 74 by a nut 113, for example, and is arranged radially outward from the flex shaft 76 and radially between the torque frame 94 and flex shaft 76. In the example, the second bearing 112 is axially aligned with and radially inward of the variable stator vane array 102. The geared architecture 48 and the second bearing 112 are arranged in a lubrication compartment 114, which is separate from the bearing compartment 71 in the example.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a core housing including an inlet case and an intermediate case that respectively provide an inlet case flow path and an intermediate case flow path, the inlet case includes an inlet case portion defining the inlet case flow path;
   a bearing support portion removably secured to the inlet case portion;
   a shaft supporting a compressor section that is arranged axially between the inlet case flow path and the intermediate case flow path, the shaft includes a main shaft, a flex shaft axially forward of the main shaft, a hub removably secured to the main shaft and splined to the flex shaft at a spline end of the flex shaft, and the compressor section includes a rotor mounted to the hub;
   a geared architecture coupled to the shaft, and a fan coupled to and rotationally driven by the geared architecture, wherein the geared architecture includes a sun gear, the sun gear supported by and cantilevered on the shaft;
   a first bearing supporting the shaft relative to the intermediate case; and
   a second bearing supporting the shaft relative to the inlet case, and the second bearing is arranged radially outward from the shaft and axially forward of the spline end of the flex shaft, the second bearing mounted to the bearing support portion, the hub supporting the second bearing,
   wherein the hub comprises a first portion extending axially between and rotationally coupling the main shaft and the flex shaft, and a second portion supporting the second bearing and extending radially outward from the first portion and axially past the spline end of the flex shaft.

2. The gas turbine engine according to claim 1, wherein the first bearing is supported on the first portion of the hub.

3. The gas turbine engine according to claim 1, wherein the first bearing is mounted to the hub axially rearward of the spline end of the flex shaft.

4. The gas turbine engine according to claim 1, wherein:
   the intermediate case includes an intermediate case portion defining the intermediate case flow path;
   the bearing support portion is a second bearing support portion; and
   a first bearing support portion is removably secured to the intermediate case portion, the first bearing mounted to the first bearing support portion.

5. The gas turbine engine according to claim 1, wherein:
   the compressor section is fluidly connected to the fan, the compressor section comprising a first pressure compressor and a second pressure compressor upstream from the first pressure compressor, the second pressure compressor including multiple compressor stages;
   the first and second bearings are arranged radially inward of and axially overlapping with at least some of the multiple compressor stages; and
   wherein the gas turbine engine is a high bypass geared aircraft engine having a bypass ratio of greater than six (6).

6. The gas turbine engine according to claim 5, further comprising:
   a combustor fluidly connected to the compressor section;
   a turbine section fluidly connected to the combustor, the turbine section comprising:
      a high pressure turbine;
      a low pressure turbine; and
   wherein the gas turbine engine includes at least one of a low Fan Pressure Ratio of less than 1.45 across a fan blade alone and a low pressure turbine pressure ratio that is greater than 5.

7. The gas turbine engine of claim 5, wherein the multiple compressor stages include a variable stator vane array, rotatable compressor blades, and a fixed stator vane array.

8. The gas turbine engine of claim 1, wherein the shaft terminates in an end that supports the sun gear.

9. The gas turbine engine of claim 8, wherein the first and second bearings are arranged on one axial side of the sun gear, and the sun gear includes another axial side opposite the one axial side that is without direct bearing support.

10. The gas turbine engine of claim 1, wherein the first bearing is a ball bearing, and the second bearing is a roller bearing.

11. The gas turbine engine of claim 1, wherein the first and second bearings are arranged in separate sealed lubrication compartments.

12. The gas turbine engine of claim 1, further comprising a lubrication compartment, the second bearing and the geared architecture arranged in the lubrication compartment.

13. The gas turbine engine of claim 1, wherein the flex shaft includes a bellow and the second portion axially overlaps the bellow.

14. The gas turbine engine of claim 13, wherein the second portion comprises a flange that is spaced radially outward from the shaft.

15. The gas turbine engine of claim 1, wherein the second portion comprises a flange that is spaced radially outward from the shaft.

16. The gas turbine engine of claim 1, wherein the geared architecture includes a torque frame supporting multiple circumferentially arranged star gears intermeshing with the sun gear, the torque frame secured to the inlet case and the bearing support portion.

17. The gas turbine engine of claim 16, wherein the second bearing is arranged radially between the torque frame and the flex shaft.

18. The gas turbine engine of claim 16, wherein the torque frame is secured to the inlet case portion and the bearing support portion at a joint.

* * * * *